United States Patent [19]

Muzyka

[11] 4,027,248
[45] May 31, 1977

[54] MOTION PICTURE BROADCASTING SOUND DELIVERY SYSTEM

[76] Inventor: George R. Muzyka, 3825 N. Newcastle Ave., Chicago, Ill. 60634

[22] Filed: Oct. 14, 1975

[21] Appl. No.: 622,268

[52] U.S. Cl. .................. 325/308; 179/1 DD; 325/54
[51] Int. Cl.² .................. H04B 1/06; H04B 11/00
[58] Field of Search .............. 325/45, 51, 53, 54, 325/64, 308; 179/1 DD, 1 AT, 1 B, 1 E, 1 MG, 2 D; 181/155, 156, 141, 149

[56] References Cited

UNITED STATES PATENTS

| | | | |
|---|---|---|---|
| 2,521,150 | 9/1950 | Chemel | 325/308 |
| 2,979,607 | 4/1961 | Herzfield | 325/54 |

Primary Examiner—Robert L. Griffin
Assistant Examiner—Marc E. Bookbinder

[57] ABSTRACT

A sound system, the sound track of a motion picture film is picked up and fed into an F.M. transmitter, the transmitter emitting modulated carrier waves in order to be picked up either by a plurality of F.M. portable receivers and F.M. vehicle receivers.

2 Claims, 2 Drawing Figures

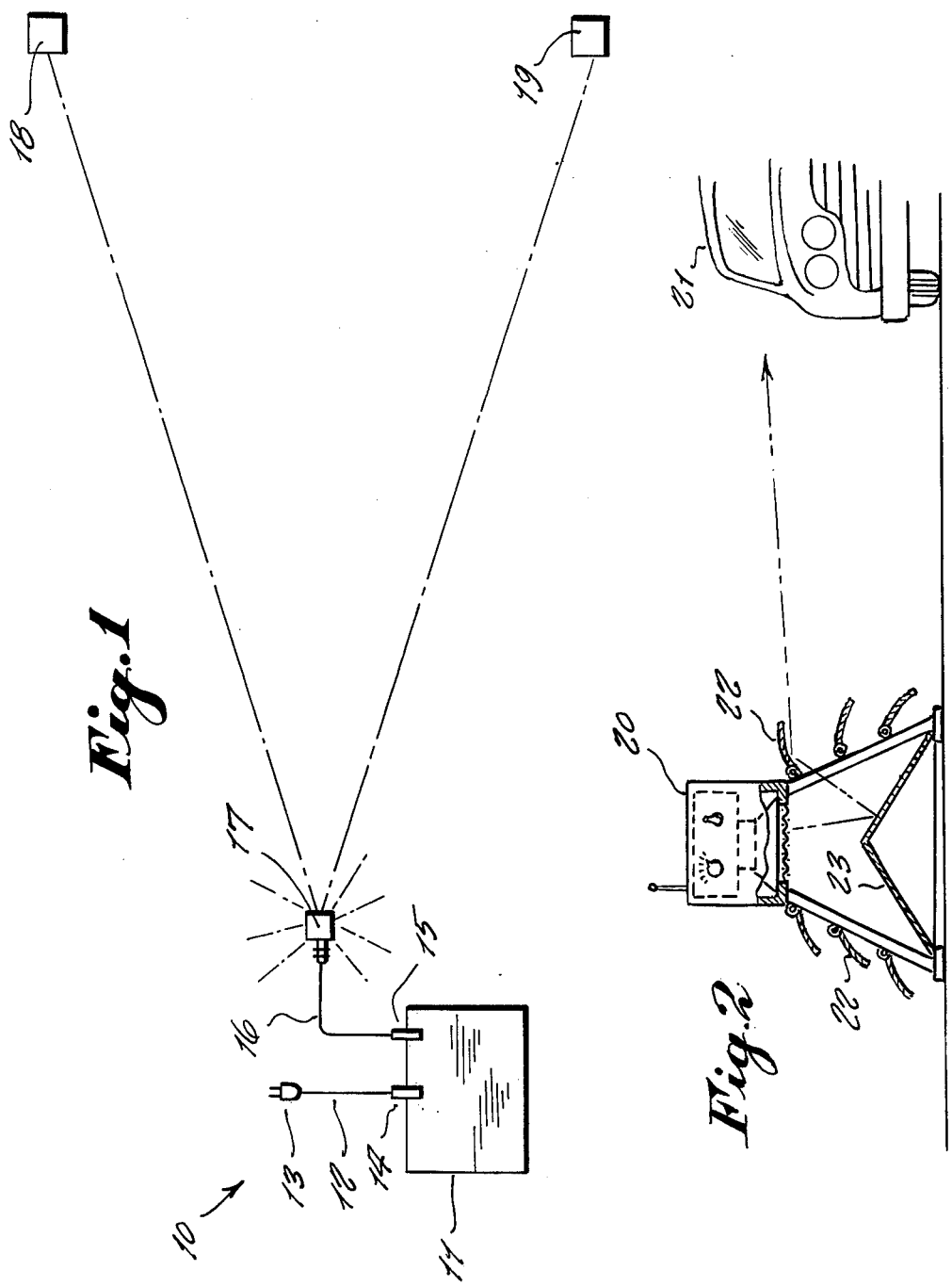

MOTION PICTURE BROADCASTING SOUND DELIVERY SYSTEM

This invention relates generally to sound transmitter and receiving systems. More particularly it relates to a motion picture broadcasting sound delivery system such as are used out-of-doors.

A principal object of the present invention is to provide a sound system which would be particularly adaptable for drive-in movie theatres, and which would eliminate the expensive electrical underground wiring system together with speaker posts and associate equipment such as used in a convention drive-in movie theatre.

Another object of the present invention is to provide a sound system for use particularly in showing sound movie films out-of-doors and which would eliminate the expensive underground electrical system and speaker posts such as are presently used in drive-in movie theatres so that the particular land can be otherwise used for other purposes as well, such as for picnics, out-of-door gatherings, out-of-door sports and the like so that the land is not used specifically only for a single purpose.

Another purpose of the present invention is to provide a system which is completely portable so that it can be set up almost anywhere that people gather and which afterwards can be quickly and easily removed therefrom.

Still a further object is to provide a sound system for use in a drive-in movie theatre, and which would encourage renewed attendance for both young and old alike by giving the patrons something in motion picture viewing.

Still a further object is to provide a sound system which employs a mini powered transmitter having a limited range and wherein the frequency could be adjusted anywhere on an F.M. dial so that local residents in the area would not be affected to hear the transmitted signal.

Other objects are to provide a sound system associated with out-of-door picture projection which is simple in design, inexpensive to manufacture, rugged in construction, easy to use and efficient in operation.

These and other objects will be readily evident upon a study of the following specification and the accompanying drawing, wherein:

FIG. 1 is a diagrammatic view of the present invention.

FIG. 2 is a side elevation view showing one design of a portable F.M. receiver and which incorporates means for confining the sound within the local area so to not affect near by residents.

Referring now to the drawing in detail, the reference numeral 10 represents a motion picture broadcasting sound delivery system according to the present invention wherein there is a sound projector 11 having an electric extension cord 12 extending outwardly of the projector, and which upon its outer end is fitted with a plug 13 for insertion into a suitable power source. The extension cord 12 is removably received within the projector line receptacle 14. A single speaker jack 15 is plugged into the projector 11, the speaker jack having an electric cord 16 extending therefrom and which serves to carry the soundtrack portion of a movie film from the projector into an F.M. transmitter 17 which by suitable antenna means delivers the modulated carrier wave to the antennas of a plurality of F.M. portable receivers and F.M. vehicle receivers 18 and 19 respectively.

It is to be noted that the output of the F.M. transmitter 17 is limited in range so as to be received in an area approximately the size of a football field.

The transmitter 17 may be adjusted to any position on the F.M. dial that will not interfere with the station frequencies that are used by the local residents.

Reference is now made to FIG. 2 of the drawing wherein there is illustrated one possible design for an F.M. portable receiver 20 and which is readily adaptable for being placed upon a ground so to be surrounded by a plurality of automotive vehicles 21 in order that sound from the receiver can be heard by the occupants within the vehicles. The F.M. portable receiver 20 is shown to direct its sound waves downwardly against a stationary baffle from where the sound waves then deflect upwardly and angularly toward adjustable baffles 22 each of which can be individually moved in order that the sound therefrom can be directed specifically to the automotive vehicles. The stationary baffle 23 is either conical or pyramid in shape. It is to be noted that baffles 22 are concaved. Thus one design of F.M. portable receiver is suggested.

It will thus be readily evident that in the present invention no underground installations are require so that the landscape is now permanently altered for use only by an outdoor drive-in movie. Accordingly there are no upwardly extending speaker posts such as are used in a conventional outdoor theatre.

While various changes may be made in the detail construction, it is understood that such changes will be within the spirit and scope of the present invention as is defined by the appended claims.

What I claim is:

1. A motion picture broadcasting sound delivery system, comprising a plurality of F.M. receivers, each including a unit wherein sound waves emanate downwardly therefrom, against a stationary baffle and are then reflected against adjustable baffles, in order that said sound waves are delivered directly towards automotive vehicles containing occupants watching a movie film.

2. A sound delivery system comprises:
a receiver for an audio modulated carrier;
a transducer coupled to said receiver for producing sound waves in response to said audio;
a sound reflecting unit including a stationary baffle for reflecting said sound waves and a plurality of adjustable baffles for providing sound waves in a plurality of directions in response to reflecting action of said stationary baffle.

* * * * *